May 30, 1944.  M. J. HERZBERGER  2,350,035
PHOTOGRAPHIC LENS
Filed June 6, 1942

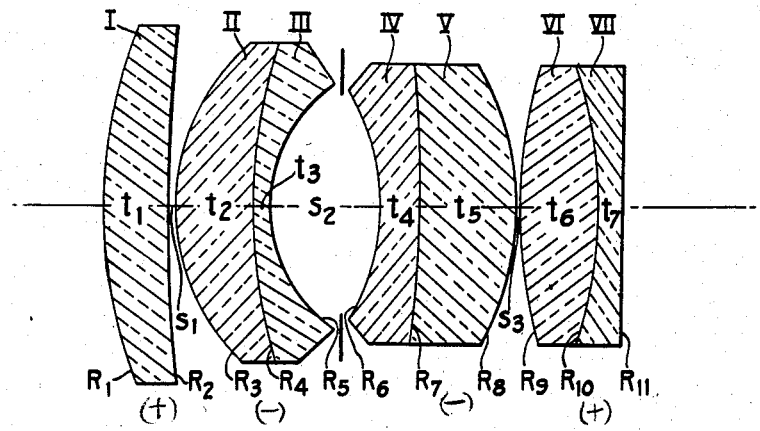

| EXAMPLE 1 | | | f = 100 mm. | | f/1.4 |
|---|---|---|---|---|---|
| LENS | $N_D$ | $\nu$ | RADII | THICKNESSES | |
| I | 1.698 | 56.1 | $R_1$ = + 88.9 mm. | $t_1$ = | 12.5 mm. |
| | | | $R_2$ = +458.0 | $s_1$ = | 0.8 |
| II | 1.639 | 55.5 | $R_3$ = + 39.1 | $t_2$ = | 14.7 |
| III | 1.621 | 36.2 | $R_4$ = + 97.0 | $t_3$ = | 2.9 |
| | | | $R_5$ = + 26.9 | $s_2$ = | 20.9 |
| IV | 1.689 | 30.9 | $R_6$ = − 40.7 | $t_4$ = | 7.0 |
| V | 1.698 | 56.1 | $R_7$ = − 382.8 | $t_5$ = | 18.4 |
| | | | $R_8$ = − 51.5 | $s_3$ = | 0.4 |
| VI | 1.744 | 45.8 | $R_9$ = + 98.5 | $t_6$ = | 14.9 |
| VII | 1.649 | 33.8 | $R_{10}$ = − 74.3 | $t_7$ = | 4.3 |
| | | | $R_{11}$ = ∞ | | |

| EXAMPLE 2 | | | f = 100 mm. | | f/1.5 |
|---|---|---|---|---|---|
| LENS | $N_D$ | $\nu$ | RADII | THICKNESSES | |
| I | 1.698 | 56.1 | $R_1$ = + 86.4 mm. | $t_1$ = | 12.0 mm. |
| | | | $R_2$ = +461.0 | $s_1$ = | 0.4 |
| II | 1.639 | 55.5 | $R_3$ = + 41.7 | $t_2$ = | 15.6 |
| III | 1.621 | 36.2 | $R_4$ = + 107.2 | $t_3$ = | 3.4 |
| | | | $R_5$ = + 27.7 | $s_2$ = | 20.7 |
| IV | 1.689 | 30.9 | $R_6$ = − 39.7 | $t_4$ = | 7.5 |
| V | 1.698 | 56.1 | $R_7$ = − 316.0 | $t_5$ = | 18.1 |
| | | | $R_8$ = − 50.4 | $s_3$ = | 0.4 |
| VI | 1.755 | 47.2 | $R_9$ = + 98.0 | $t_6$ = | 15.1 |
| VII | 1.649 | 33.8 | $R_{10}$ = − 90.2 | $t_7$ = | 3.8 |
| | | | $R_{11}$ = ∞ | | |

MAXIMILIAN J. HERZBERGER
INVENTOR

BY
ATT'Y & AG'T

Patented May 30, 1944

2,350,035

UNITED STATES PATENT OFFICE 2,350,035

PHOTOGRAPHIC LENS

Maximilian J. Herzberger, Rochester, N. Y., assignor to Eastman Kodak Company, Rochester, N. Y., a corporation of New Jersey Application June 6, 1942, Serial No. 446,085

3 Claims. (Cl. 88—57)

This invention relates to photographic lenses and is mainly an improvement on the lens described in U. S. 2,262,998 to Frederick and myself. However, some aspects of the present invention may find a slightly more general application.

The main object of the present invention is to give an extremely flat field with practically no coma and very good rim ray correction, with the other aberrations held well within tolerance limits.

The invention relates specifically to four component objectives in which the two outer ones are positive and the two inner ones are menisci highly concave toward a diaphragm therebetween. This class of objectives is well known. According to the present invention, such an objective is improved by having a front component which is a single element with an index of refraction between 1.65 and 1.75 and a dispersive index between 50 and 60. Furthermore, each of the menisci components are doublets, the negative element in each being nearer the diaphragm and being cemented to a positive element of higher index of refraction, the cemented surfaces in each of the menisci being concave toward the diaphragm. Furthermore, each of the elements in the rear meniscus component should have an index of refraction between 1.65 and 1.75 and the rear component of the objective should include a positive element whose index of refraction is greater than 1.7.

Combining this invention with the teachings of U. S. 2,262,998, mentioned above, we note that the rear component should be compound with a cemented surface also concave toward the diaphragm and having a radius of curvature between .5F and 5F where F is the focal length of the whole objective. The positive element of the rear component is the one having an index of refraction greater than 1.7 and it should be at least .04 greater than that of the rear negative element.

The accompanying drawing illustrates a preferred embodiment of the invention, the specifications for two forms thereof being given.

These specifications are as follows:

Example 1

F=100 mm.     f/1.4

| Lens | $N_D$ | $\nu$ | Radii | Thicknesses |
|---|---|---|---|---|
| I | 1.698 | 56.1 | $R_1=+\ 88.9$ mm.<br>$R_2=+458.0$ | $t_1=12.5$ mm.<br>$S_1=\ 0.8$ |
| II | 1.639 | 55.5 | $R_3=+\ 39.1$ | $t_2=14.7$ |
| III | 1.621 | 36.2 | $R_4=+\ 97.0$<br>$R_5=+\ 26.9$ | $t_3=\ 2.9$<br>$S_2=20.9$ |
| IV | 1.689 | 30.9 | $R_6=-\ 40.7$ | $t_4=\ 7.0$ |
| V | 1.698 | 56.1 | $R_7=-382.8$<br>$R_8=-\ 51.5$ | $t_5=18.4$<br>$S_3=\ 0.4$ |
| VI | 1.744 | 45.8 | $R_9=+\ 98.5$ | $t_6=14.9$ |
| VII | 1.649 | 33.8 | $R_{10}=-\ 74.3$<br>$R_{11}=\infty$ | $t_7=\ 4.3$ |

Example 2

F=100 mm.     f/1.5

| Lens | $N_D$ | $\nu$ | Radii | Thicknesses |
|---|---|---|---|---|
| I | 1.698 | 56.1 | $R_1=+\ 86.4$ mm.<br>$R_2=+461.0$ | $t_1=12.0$ mm.<br>$S_1=\ 0.4$ |
| II | 1.639 | 55.5 | $R_3=+\ 41.7$ | $t_2=15.6$ |
| III | 1.621 | 36.2 | $R_4=+107.2$<br>$R_5=+\ 27.7$ | $t_3=\ 3.4$<br>$S_2=20.7$ |
| IV | 1.689 | 30.9 | $R_6=-\ 39.7$ | $t_4=\ 7.5$ |
| V | 1.698 | 56.1 | $R_7=-316.0$<br>$R_8=-\ 50.4$ | $t_5=18.1$<br>$S_3=\ 0.4$ |
| VI | 1.755 | 47.2 | $R_9=+\ 98.0$ | $t_6=15.1$ |
| VII | 1.649 | 33.8 | $R_{10}=-\ 90.2$<br>$R_{11}=\infty$ | $t_7=\ 3.8$ |

In the above tables, Example 2 has a slightly smaller relative aperture but also gives a much flatter field. It will be noted that in both cases the characteristics of the lens are within the limits described above, which are apparently necessary to gain the rim ray correction of this lens.

Having thus described the preferred embodiments of my invention, I wish to point out that it is not limited to these structures but is of the scope of the appended claims.

What I claim and desire to secure by Letters Patent of the United States is:

1. A photographic objective of the type having four axially spaced components of which the two outer ones are positive and the two inner ones are menisci highly concave toward a diaphragm therebetween characterized by the rear component being compound with a cemented surface concave toward the diaphragm and having a radious of curvature between —.5F and —5F where F is the focal length of the objective and which surface separates two glasses the front one of which has an index of refraction at least .04 greater than that of the other and by the ratio $R_4:R_5$ being between 5:4 and 5:2 where $R_5$ and $R_4$ are the radii of curvature respectively of the rear surface of the second component and of the front surface of the third component, and further characterized by the meniscus component immediately behind the diaphragm being compound with a cemented surface concave toward the diaphragm between two elements, the rear one of which has the higher index and by the front component of the objective being of glass with an index of refraction between 1.65 and 1.75 and a dispersive index between 50 and 60.

2. A photographic objective of the type having four axially spaced components of which the two outer ones are positive and the two inner ones are menisci highly concave toward a diaphragm therebetween characterized by the front component being a single element with an index of refraction between 1.65 and 1.75 and a dispersive index between 50 and 60, the meniscus components being doublets with a negative element in each component cemented to a positive element of higher index of refraction, the negative element being nearer the diaphragm and the two cemented surfaces being concave toward the diaphragm, each of the elements in the rear meniscus component having an index of refraction between 1.65 and 1.75, the radii of curvature of the front surface of the third component and the rear surface of the second component being in a ratio between 5:4 and 5:2 and the rear component including a positive element whose index of refraction is greater than 1.7.

3. A photographic objective having approximately the following specifications:

| Lens | $N_D$ | $\nu$ | Radii | Thicknesses |
|---|---|---|---|---|
| I | 1.70 | 56 | $R_1=+\ .9\ F$ | $t_1=.1\ F$ |
|   |   |   | $R_2=+\ 5.\ F$ | $S_1=.005F$ |
| II | 1.64 | 56 | $R_3=+\ .4\ F$ | $t_2=.15\ F$ |
| III | 1.62 | 36 | $R_4=+\ \ \ F$ | $t_3=.03F$ |
|   |   |   | $R_5=+\ .25F$ | $S_2=.2\ F$ |
| IV | 1.69 | 31 | $R_6=-\ .4\ F$ | $t_4=.07\ F$ |
| V | 1.70 | 56 | $R_7=-\ 3.\ F$ | $t_5=.2\ F$ |
|   |   |   | $R_8=-\ .5\ F$ | $S_3=.004F$ |
| VI | 1.75 | 46 | $R_9=+\ \ \ F$ | $t_6=.15\ F$ |
| VII | 1.65 | 34 | $R_{10}=-\ .8\ F$ | $t_7=.04\ F$ |
|   |   |   | $R_{11}>\ 10\ \ F$ | | where F is the focal length of the objectives, Roman numerals refer to lens elements from front to rear, $N_D$ is the index of refraction for the D line of the spectrum, $\nu$ is the dispersive index, $R_1$ to $R_{11}$ are respectively the radii of curvature of the refractive surfaces from front to rear, $t_1$ to $t_7$ are respectively the thicknesses of the elements, $S_1$ to $S_3$ are respectively the air spaces between the components measured on the axis and the + and — signs refer respectively to surfaces convex and concave to the front.

MAXIMILIAN J. HERZBERGER.